June 8, 1948.  P. J. GAYLOR  2,442,804
PURIFICATION OF SIRUPS BY SOLVENT EXTRACTION
Filed June 21, 1944
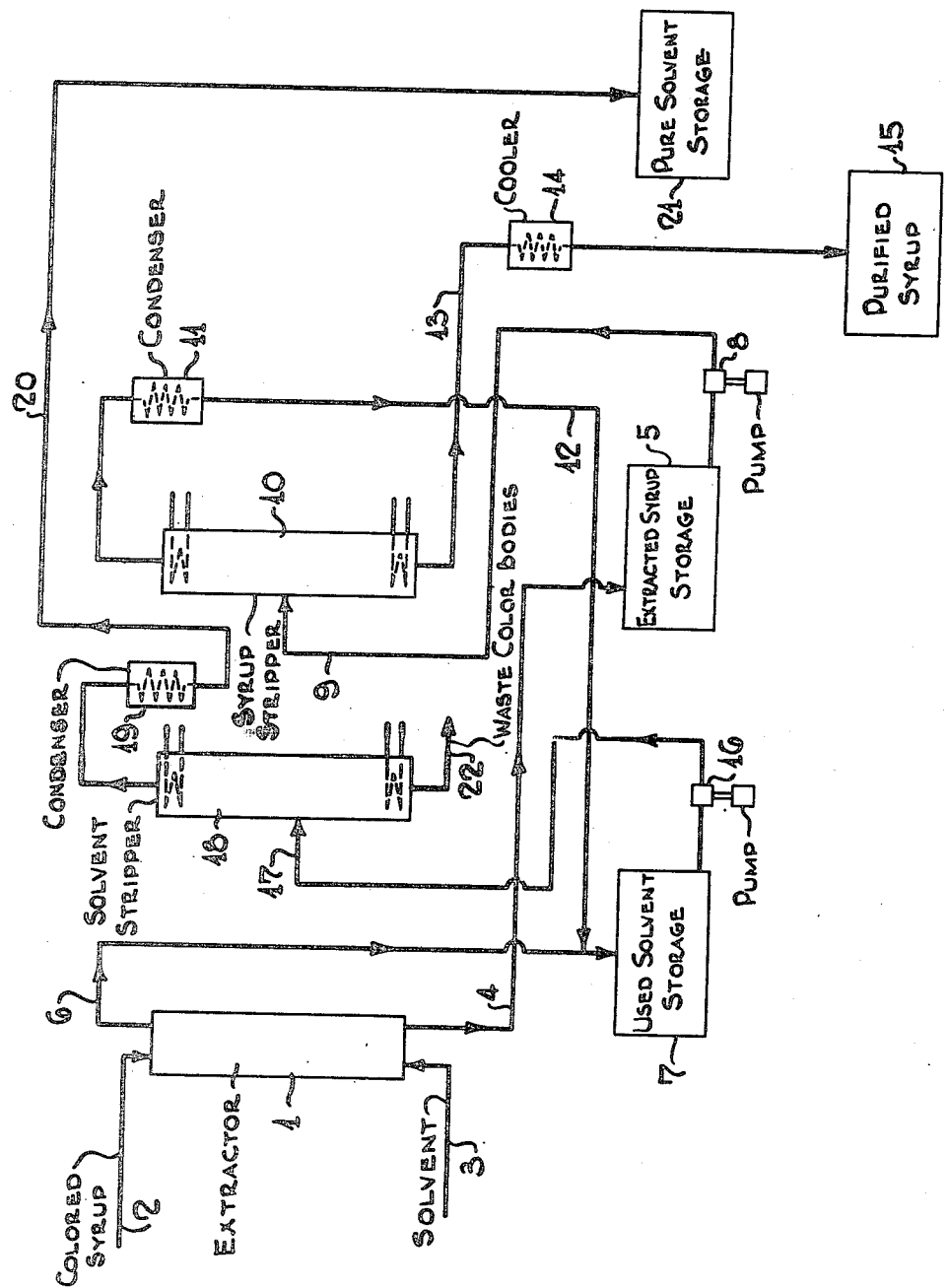
Peter J. Gaylor  Inventor
By Peter J. Gaylor  Attorney

UNITED STATES PATENT OFFICE 2,442,804

PURIFICATION OF SIRUPS BY SOLVENT EXTRACTION

Peter J. Gaylor, Union, N. J.

Application June 21, 1944, Serial No. 541,451

5 Claims. (Cl. 127—48)

This invention deals with the purification of syrups and sugar-like materials. More specifically, it concerns the removal of coloring bodies and other undesirable constituents from sugar-containing substances by solvent extraction.

Color in sugars has been an age-old problem in the sugar industry, and a good deal of the refining cost of these food products resides in the color removing operations. Usually, sugar juice when made from cane is crystallized in the form of a dark colored raw sugar. This is then water-washed to remove some of the color bodies (eventually disposed of as molasses), and the remaining sugar is dissolved up in water and subjected to a pre-filtration operation, followed by bone-char and/or activated carbon such as "Suchar," "Nuchar," "Darco," "Norit," "Carboraffin," and similar materials. The finished product is finally crystallized to solid sugar or sold as a syrup.

In many cases, sugars and starches are inverted by heating with a small amount of acid. For example, sucrose under these conditions inverts to levulose and dextrose, while inulin, the starch-like constituent of the Jerusalem artichoke is inverted to a sugar rich in levulose. On the other hand, corn starch inverts to a sugar rich in dextrose. These invert sugars are generally highly colored and must be decolorized by large quantities of charcoal or other adsorbent involving expensive equipment and operation, since the carbon must be regenerated frequently and a loss of carbon is always encountered.

Within recent years, some processes have been developed on the use of bleaching agents such as hydrogen peroxide, hypochlorites, etc., for decolorization of sugars. Although these treatments are often effective to some degree, they do not remove the color bodies, but merely convert them by oxidation to less colored forms. For this reason such treatments are temporary, the color reverting back to the dark type on standing within a short time after treatment.

An object of this invention is to actually separate and remove the color bodies and other non-sugars from the sugars by means of solvents. Another object is to eliminate or reduce the expensive carbon or bleach decolorizing operations now employed. Still other objects will become apparent as the description proceeds.

The present process involves the use of immiscible or insoluble solvents, preferably organic liquid compounds, for removing the color from the sugars or solutions thereof. If solid sugar is employed, it is comminuted in a finely divided state and contacted with the solvent, counter- currently, if a continuous process is to be employed. However, it is generally preferred to dissolve the sugar in water to a concentration of about 50°–70° Brix and then scrub the solution with the desired solvent or mixture of solvents. Countercurrent contacting in a bubble-cap plate tower with sufficient settling space for the extract is the most effective method, although packed towers, or even batch agitation may be employed, if desired.

The selective solvents for removing the color bodies as well as some of the ash constituents and non-sugars are organic cyclic ethers possessing two oxygen atoms per molecule. These compounds fall in the general class covered by the formula:

where $R_1$ and $R_2$ may be —$CH_2$—, —$CH_2CH_2$—,

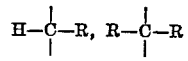

—CHR—$CH_2$—, and —CHR—CHR—, where R is an organic group comprising a hydrocarbon radical having from 1 to 3 carbon atoms, or various combinations of these. It is preferable that these ethers exhibit an appreciable solubility for water, in the neighborhood of at least 10–20 g. water per 100 ml. of solvent at 20° C. In fact, some of the best solvents are completely miscible with water at room temperature, but form two layers with sugar syrup of 50°–70° Brix. It is also preferred to employ relatively low boiling solvents of a specific gravity lower than that of the sugar solution treated. Compounds boiling below 130° C. and preferably below 110° C. are most suitable. Some of these solvents form azeotropes with water, and for reasons to be pointed out later, such azeotropes are often more suitable for use than the anhydrous solvents themselves.

Examples of suitable solvents are given in the following table:

1,4 dioxan (glycol ethylene ether), density 1.0353, M. P. 11.7° C., B. P. 101.5° C., infinitely soluble in water; forms azeotrope with water, B. P. 86.9° C. at 742 mm. containing about 80% dioxan.

1,3 dioxan (trimethylene glycol methylene ether), density 1.0342, B. P. 105° C. at 755 mm., infinitely soluble in water.

2 methyl 1,3 dioxalane (ethylene ethylidene ether), density 1.002, B. P. 82.5° C., solubility in water 66.7 g. per 100 ml.

These solvents have no deleterious effect upon the sugar, and although some of them may be toxic if taken internally, they can be removed completely by the use of the following procedure which is given merely as an example and is not intended to limit the scope of the invention:

Referring to the accompanying drawing showing a flowsheet of the process, numeral 1 designates an extraction tower filled with packing material, bubble-cap plates, or other suitable contacting material. The colored syrup enters the top of the extractor 1 at 2 where it meets the countercurrent stream of solvent pumped into the tower at 3. The extracted syrup is drawn off at 4 and sent to the extracted syrup storage 5. The extract leaving the extractor at 6, on the other hand, is run into the used solvent storage tank 7.

Coming back to the extracted syrup in storage tank 5, this material is pumped by pump 8 through line 9 into stripper column 10 where the solvent is flashed off in a fractionating zone employing some reflux, and the overhead containing solvent is cooled by condenser 11 and run through line 12 into the used solvent storage tank 7. The bottoms from the syrup stripper 10 are withdrawn through line 13 and cooler 14 and stored in the purified syrup storage tank 15.

Now, going back to the used solvent storage tank 7, the spent solvent containing extracted impurities is pumped by pump 16 through line 17 into a solvent stripping still 18, also equipped with a heating and refluxing means. The overhead is cooled by condenser 19 and run through line 20 into the pure solvent storage tank 21, ready for recycling through the system. The bottoms from still 18 containing the impurities extracted from the sugar are discarded through line 22.

If an anhydrous solvent is desired, a hydrocarbon such as hexane or cyclohexane may be employed to dehydrate the constant boiling mixture by azeotropic distillation.

Experiments indicate that the color from raw sugar and invert sugar is more easily removed when the solvent contains two oxygen atoms per molecule. It might be pointed out here that water-white stable sugars may be produced by this process without the use of any adsorbents or bleaching agents. The temperature of extraction is preferably somewhat above room temperature, since the viscosity of the syrup is then low enough to insure adequate contact surface with the solvent. However, lower or higher temperatures may be employed as would most economically fit in with the refinery operations. Mixtures of two or more solvents may be employed for certain sugars to obtain maximum selectivity. Emulsifying or demulsifying agents may be added if necessary to effect the separation of phases and thus eliminate long settling periods or centrifuges.

Since all of the solvents employed in the present invention possess an appreciable solubility for water, it is essential that the sugar content of the syrup to be extracted be sufficiently high to cause separation of layers. Dioxan 1,4, for example, is completely miscible with water or dilute sugar solutions, yet it forms two layers with a syrup of 70° Brix. In most cases, it has been found that the sugar concentration must be at least about 50% before satisfactory color removal is effected. It is also possible to effect a crystallization of the sugar in the presence of appreciable amounts of these solvents which retain the color bodies, allowing the production of clean crystalline sugar with a minimum number of strikes. Cooling to below room temperature, say at 0° F. or below, is often advantageous in such cases.

Since the solvent removes some water from the syrup in most cases, it is advantageous to employ an aqueous solvent which will replace some or all of the water thus removed. In such case, the azeotrope of 1,4 dioxan containing about 20% water is highly suitable for the purpose. If, on the other hand, a concentrated syrup is required, as is often the case with fruit juices, an anhydrous cyclic ether solvent may be employed and the water thus removed may be separated from the solvent by hydrocarbon azeotropic distillation, distillation in presence of pearl-ash concentrated solution (as described in U. S. Patent 2,081,189), etc. This method of dehydration, as stated previously, involving simultaneous dehydration and purification, is particularly useful in the case of fruit and similar juices and syrups where long time heating during distillation is destructive to the flavoring and other desired bodies, even when carried out under vacuum. The small amount of residual solvent remaining in the syrup may be removed by a short vacuum distillation, or by prior extraction with a less water soluble solvent for the ether, such as tertiary butyl alcohol, methyl ethyl ketone, ethyl acetate, and the like, which would remove the trace of cyclic ether solvent, followed by distillation of the latter solvent, preferably under vacuum.

By the present method it is possible to prepare extracted sugars and especially aqueous syrups substantially free of coloring bodies, having a low non-sugar and ash content, and showing substantially no color formation after storage for ten days at 80° F. under non-fermenting conditions.

Practically all types of sugars and solutions thereof, containing coloring bodies may be decolorized by the method herein described. Dextrose, levulose, invert sugars, molasses, concentrated raw sugar and fruit juices, and hydrolyzed starches and starchy materials may be so treated. Invert sugar is particularly well purified by such treatment, but other sugars, fruit juices and concentrates, glycerols, glycols and other water soluble polyhydroxy compounds may be purified in like manner.

The following examples illustrate many of the phases involved in the present invention and show the superiority of the cyclic ether type solvents over other solvents for this purpose:

*Example 1.*—A sample of Philippine raw sugar was made up to 70° Brix in water and extracted with equal volumes of isopropyl ether at room temperature. Practically no color bodies were removed from the concentrated sugar solutions after repeated extractions. Very slight mutual solubility was exhibited by the two liquids.

*Example 2.*—A sugar syrup such as that employed in Example 1 was repeatedly extracted with equal volumes of methyl ethyl ketone. The syrup was practically insoluble in the solvent, and no noticeable color removal resulted.

*Example 3.*—A sample of invert from raw cane sugar of 70° Brix was extracted with equal volumes of 1,4, dioxan at room temperature. Substantial color removal was observed on the first extraction. The extraction was repeated twice with the same volume, and a fairly large amount of residual color was removed. After the third similar extraction, the yellow-colored solvent was removed, and the bottom thick syrup layer of higher viscosity than the original syrup was observed to be practically color-free. The solvent removed an appreciable amount of water with the coloring bodies.

Example 4.—Equal volumes of invert and methyl acetate were shaken up in four separate extractions. The first two extractions removed some color, while the last two were not very effective. The overall color removal was fair.

Example 5.—A sample of invert was extracted with an equal volume of ethylene dichloride. No appreciable color removal was observed.

Example 6.—A saturated aqueous solution of Cuban raw sugar was extracted three times with equal volumes of 1,4, dioxan. Appreciable color removal resulted from this treatment.

Example 7.—An attempt was made to extract invert sugar with methyl "Cellosolve." The solvent was completely miscible with the sugar solution even on cooling to below room temperature.

Example 8.—A sample of Philippine sugar syrup of 60° Brix was shaken with an equal volume of methyl "Carbitol," (diethylene glycol monomethyl ether). The two liquids were completely miscible even when cooled somewhat below room temperature.

Example 9.—A sample of cane sugar invert syrup was extracted with equal volumes of methyl sulfate. Practically no color removal was observed at room temperature. The same results were obtained with Cuban raw sugar syrup.

I claim:

1. The method of purifying colored aqueous sugar syrup of about 50 to 70° Brix comprising extracting said syrup with a water soluble organic cyclic ether having two oxygen atoms per molecule and having a boiling point below 130° C., thereby obtaining an extract layer and a syrup layer, separating the layers, distilling the extract layer to recover the ether, and recycling said ether to the extraction step.

2. The method according to claim 1 in which the syrup later is subjected to a stripping action to remove the ether solvent, collecting said solvent, and recycling it to the extraction step.

3. The method according to claim 1 in which the cyclic ether is 1,4 dioxan in the form of an azeotrope with water.

4. The method according to claim 1 in which the syrup is cane sugar syrup.

5. The method according to claim 4 in which the syrup is cane sugar invert syrup.

PETER J. GAYLOR.

REFERENCES CITED

The following references are of record in the file of this patent:

UNITED STATES PATENTS

| Number | Name | Date |
|---|---|---|
| 2,003,965 | Bloch | June 4, 1935 |
| 2,022,093 | Reich | Nov. 26, 1935 |
| 2,022,824 | Reich | Dec. 3, 1935 |
| 2,109,503 | Reich | Mar. 1, 1938 |
| 2,130,029 | Reich | Sept. 13, 1938 |
| 2,280,723 | Schoch | Apr. 21, 1942 |